INVENTORS: H. L. B. GOULD
D. H. WENNY, JR.

ATTORNEY

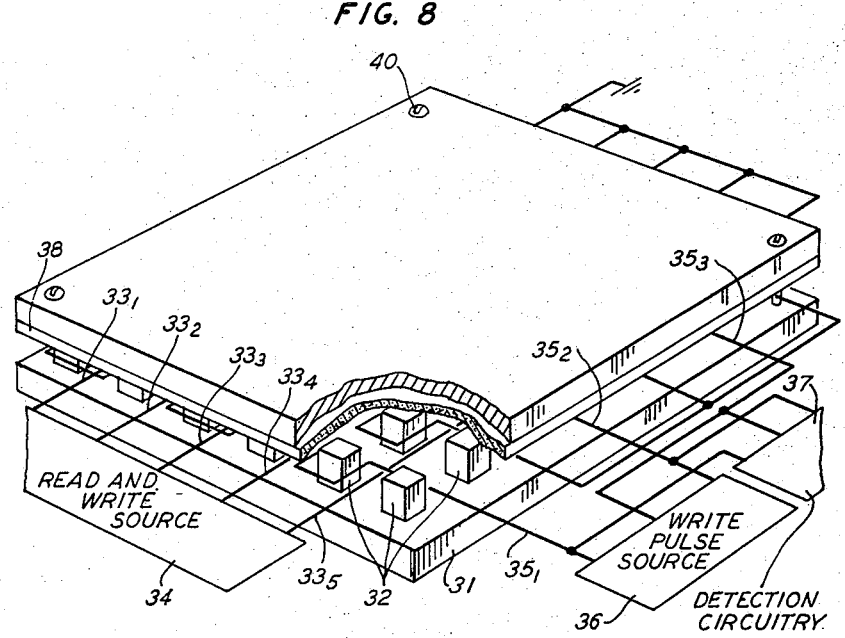
FIG. 8
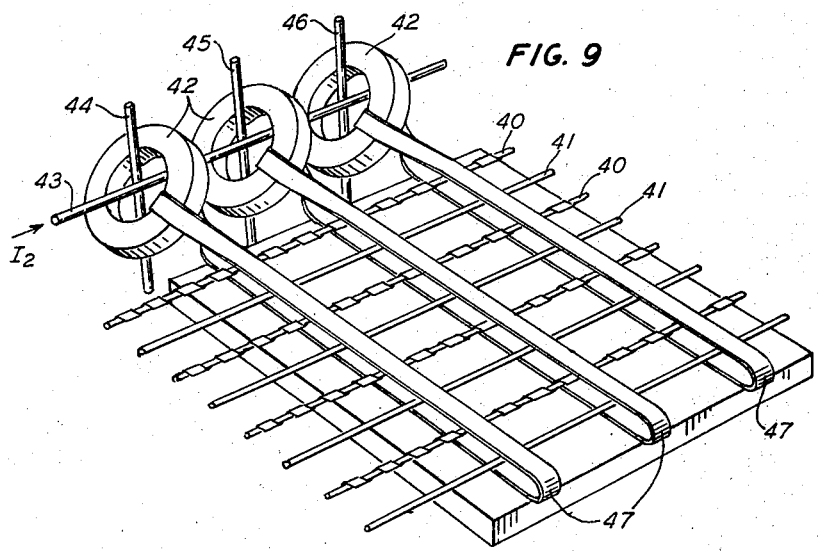
FIG. 9
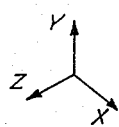

United States Patent Office 3,422,407
Patented Jan. 14, 1969

---

3,422,407
DEVICES UTILIZING A COBALT-VANADIUM-IRON MAGNETIC MATERIAL WHICH EXHIBITS A COMPOSITE HYSTERESIS LOOP
Harold L. B. Gould, Kinnelon, and Daniel H. Wenny, Jr., Morris Township, Morris County, N.J., assignors to Bell Telephone Laboratories, Incorporated, New York, N.Y., a corporation of New York
Continuation-in-part of application Ser. No. 405,201, Oct. 20, 1964. This application Apr. 21, 1965, Ser. No. 449,788
U.S. Cl. 340—174     7 Claims
Int. Cl. G11b 5/00; H01f 1/02; H01f 7/02

This is a continuation-in-part of my copending application Ser. No. 405,201, filed Oct. 20, 1964, now abandoned, and relates to processes for making alloy materials having unusual magnetic properties, to the materials themselves, and to devices containing such materials.

The materials of this invention are considered to be of particular interest in the fabrication of magnetic elements depending for their operation on remanent magnetization. This is a broad field of interest which encompasses magnetic switches, and memory elements generally.

The design and fabrication of remanent magnetic elements is a sophisticated science, having resulted in a large number of devices showing varying characteristics fulfilling varying needs. Such devices include the now common core memories which may take the form of a pierced sheet of U.S. Patent 2,912,677, issued Nov. 10, 1959 to R. L. Ashenhurst et al., the twistor of U.S. Patent 3,083,353, issued Mar. 26, 1963 to A. H. Bobeck, the laddic of U.S. Patent 2,963,591, issued Dec. 6, 1960 to T. H. Crowley et al., as well as the various devices described in U.S. Patent 2,736,880, issued May 11, 1956 to J. W. Forrester. Such devices may utilize open as well as closed flux paths, which may have associated with them printed as well as wire or even waveguide conductive paths and may effect partial switching by passage of the current through the magnetic material itself.

Most of these devices depend for their operation on the presence of remanence, that is the ability of the material of which the memory element is constructed to remain magnetized after removal of an applied field. Interrogation of such an element involves reversing the direction of magnetization, often by the field produced by one or more associated current paths. Many element arrays utilize coincident current paths and so require the passage of "half currents" (each equal to one-half the current value required to produce a field necessary to overcome the coercivity of the material) in both paths simultaneously. Reading is accomplished by sensing the current induced in an associated winding by flux reversal with such current or currents.

Most magnetic memories and magnetic switches now in use are temporary, in that the flux switching, which occurs during the readout cycle for any segment magnetized during the write cycle, leaves the element in its initial magnetic condition, that is, the condition representing no information storage. Such destructive memories are useful in many switching and memory applications. For example, in most parts of a computer, there is no need to store the problem after the circuit has yielded the answer. Similarly, in many switching applications, it is necessary only for the switch to perform its function once, with no requirement of permanent store.

There are, however, situations calling for apparatus designs in which information once stored must be yielded repeatedly. This is true in many uses of the twistor in electron switching where the storage elements may serve to define a particular circuit path which is necessarily the inflexible response to a given interrogation. At this time, this desideratum is often served by associating a plurality of small permanent magnets with the bit locations intended to yield an induced current upon interrogation, the remanent magnetization of the permanent magnets being sufficient to overcome the coercivity of the softer magnetic material of which the material is constructed. In other circuitry, this may be accomplished by use of a constant D-C bias through a current path. An example of the latter is the biased core access switch often associated with memory arrays.

More recently, effort has been directed toward the development of an electrically alterable permanent memory element operating on the piggyback principle. An example of this type of element is described in U.S. Patent 3,067,408, issued to W. A. Barrett, Jr. on Dec. 4, 1962. Such devices depend for their operation upon the use of two, usually contiguous, magnetic materials, the nature of the materials and the design of the device being such that the remanence of the harder of the two materials is sufficient to overcome the coercivity of the softer. Such devices may be operated simply by using currents of sufficient magnitude for switching the coercivity of the harder material in the write function, and currents only of sufficient magnitude to switch the lower coercivity material during the read cycle. They are, of course, somewhat more complex in their construction in requiring two separate magnetic flux paths.

The instant invention derives from the discovery that alloy materials within a defined compositional range, when processed in accordance with an extremely critical set of conditions, yield an element which may simultaneously serve both as hard and soft magnetic materials. These materials yield a D-C hysteresis loop identical in form to the composite loop associated with the piggyback element. This loop may be treated as being composed of a major and a minor loop, with the minor loop representing the softer of the two piggyback materials. This "minor loop material" is returned to its desired state of magnetization after interrogation due to the remanence of the harder material represented by the major loop.

The materials of this invention are alloys of the composition: 78 to 95 weight percent cobalt, 4.5 to 11 weight percent vanadium, remainder iron, to which standard additives may be made and in which certain unintentional inclusions may be tolerated. Above 95 percent cobalt, the requisite cold working absolutely necessary for these purposes, is unfeasible. Below 78 percent, the composite loop characteristics are not attained. A preferred range of inclusion of this ingredient is from 80 to 88 weight percent based on the same considerations. Vanadium inclusion at at least the minimum indicated is required for the composite characteristic. A vanadium content of more than 11 percent again poses a workability problem, such high concentrations resulting in embrittlement. A preferred vanadium range is from 5.85 percent to 8 percent.

Other inclusions, intentional and unintentional, are known to those skilled in the art and are included or tolerated to certain limits for reasons which are understood. In the examples herein many of the compositions contain manganese in amount of up to about one percent by weight based on the total composition. This inclusion is designed to bind any sulfur commonly present in commercial materials. Suitable alternatives are beryllium, magnesium, calcium, etc. Aluminum, frequently added to control oxygen, may be added in amount of up to one-quarter of one percent by weight. Frequently encountered unintentional ingredients include nickel, often at a level of a half of one percent in certain commercial materials, tolerable up to a level of about two percent. Silicon may be present in amount of up to about two percent, beyond which workability is impaired. Similar considerations apply to molybdenum and tungsten, also tolerable up to about two percent, phosphorus and sulfur, tolerable only up to about one-tenth of one percent, and manganese, to about two percent.

Necessary processing constitutes the final steps of cold working such as to result in a minimum thickness reduction of 90 percent as calculated from the fraction:

$$\frac{t_1 - t_2}{t_1}$$

where $t_1$ and $t_2$ are a dimension subject to reduction during working, before and after reduction, respectively, as well as the step of partial annealing carried out over the temperature range of from 150° C. to 800° C. for the minimum time required to bring the body undergoing processing to such temperature for a period of at least ½ minute. Typical partial anneal schedules are from ½ hour to 3 hours over the indicated temperature range, where a total thickness of ¼ inch or greater is to be treated, and from ½ minute to 10 minutes where a single strand of material of thickness of up to 0.025 inch is treated separately. Cold-working may take any of the usual forms so long as the reduction as specified is accomplished. Forms of reduction found suitable include flat rolling, in the form of sheet, drawing, to produce either round or flat sections, and roll flattening, to produce tape. Both the cold working and the partial annealing are necessary.

The history of the material prior to the two steps set forth in the preceding paragraph is determined only by expediency. For example, where the initial body is of such dimensions that cold working to the final configuration is unfeasible, it may involve whatever sequence of hot and cold working steps may usefully be incorporated to yield a configuration of such dimensions as to be amenable to the necessary cold working. A detailed description of the invention is facilitated by reference to the drawing, in which:

FIG. 1, on coordinates of magnetization, B, in gauss on the ordinate and applied field, H, on the abscissa, is a D-C hysteresis loop for a material which has undergone only the requisite cold reduction but not the partial anneal;

FIG. 8 is a perspective view, partly in section, of a different type of memory array utilizing a material herein; and FIG. 9 is a perspective view showing a memory array utilizing internally biased access switches constructed of one of these materials.

Detailed description of FIGS. 1 through 5 is in terms of corresponding Examples 1 through 5, each describing processing conditions which resulted in the material upon which the loops for the similarly numbered figures were measured.

EXAMPLE 1

A melt was prepared of the following materials:

Cobalt _____ 1643 grams, or 82.2 weight percent.
Iron _____ 235 grams, or 11.7 weight percent.
Vanadium _____ 112 grams, or 5.6 weight percent.
Manganese _____ 10 grams, or .5 weight percent.

The materials were reacted at a temperature of approximately 1550° C. The melt was held at temperature for about two minutes to ensure thorough mixing and solution of the ingredients and was then poured into a mold and solidified to make an ingot about three-quarters inch in diameter and eight inches in length. The ingot was heated to a temperature of 1200° C. and hot rolled to a flat strip 0.100 inch thick. Attainment of this thickness required about 10 steps, with reheating between steps as required. The resulting strip was examined and surface defects were removed by machining. It was then dead annealed for one hour at 950° C. in a protective atmosphere of hydrogen. The strip was then cold rolled without intermediate anneal to 0.001 inch, representing a thickness reduction of 99 percent.

Figure 1:
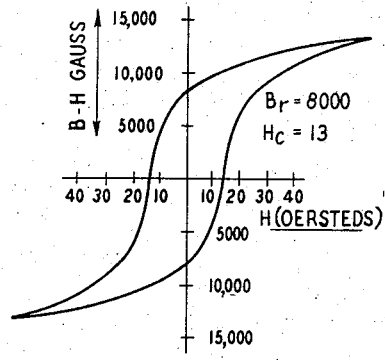

FIG. 1 is the measured hysteresis loop for this material. The loop is skewed, has a residual induction or remanence, $B_R$, of 8000 gauss, a coercive force, $H_c$, of 13 oersteds, and a squareness ratio, $B_R/B_{sat}$, of 0.55 $B_{sat}$ represents saturation magnetization. The form of this figure shows no indication of a composite loop and is typical of single-phase compositions.

EXAMPLE 2

The composition of Example 1 was processed as there indicated to obtain a one-mil thick strip which was then heat treated for a period of two hours at a temperature of 610° C.

Figure 2:
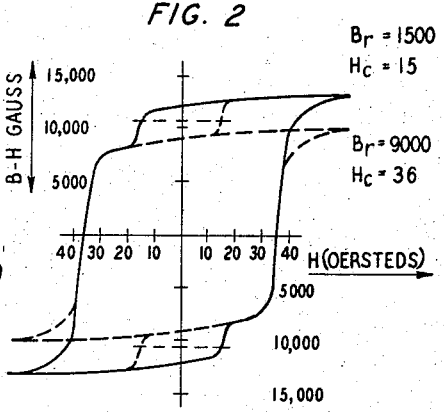
FIG. 2 is a similar plot on the same coordinates for the material of FIG. 1 after annealing.
Figure 3:
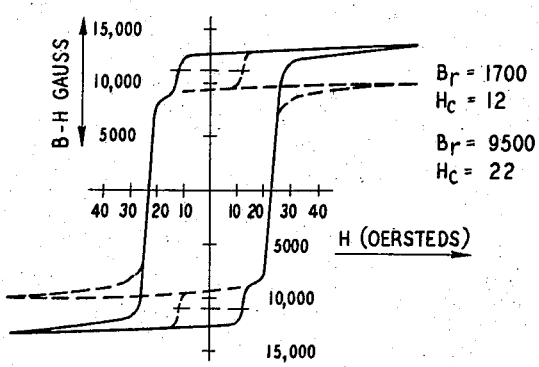
FIG. 3 is a similar plot on the same coordinates for the composition of FIG. 1 processed under different annealing conditions so as to result in a composite loop.

The D-C magnetic characteristics of the resulting strip are plotted on FIG. 2. The dashed lines on this figure represent the minor and major loops into which the composite loop can be resolved. The major loop of this figure has a coercivity, $H_c$, of 36 oersteds and a residual induction, $B_R$, of 9000 gauss. The minor loops have a coercivity of 15 oersteds and a residual induction of 1500 gauss.

EXAMPLE 3

The composition of Example 1 was again processed as there indicated to yield a one-mil thick strip. This strip was annealed in a protective atmosphere at a temperature of 580° C. for a period of two hours. The hysteresis loop of FIG. 3 resulted. Annealing at this lower temperature resulted in a somewhat lower coercivities and in a somewhat less pronounced composite loop. Major loop characteristics are an $H_c$ of 22 oersteds and a $B_R$ of 9500 gauss. Minor loop characteristics are an $H_c$ of 12 oersteds and a $B_R$ of 1700 gauss.

EXAMPLE 4

The procedure of Example 1 was followed, however utilizing the following materials in the indicated amounts:

Cobalt _____ 1621 grams, or 80.6 weight percent.
Iron _____ 230 grams, or 11.5 weight percent.
Vanadium _____ 150 grams, or 7.5 weight percent.
Manganese _____ 8 grams, or 0.4 weight percent.

Figure 4:
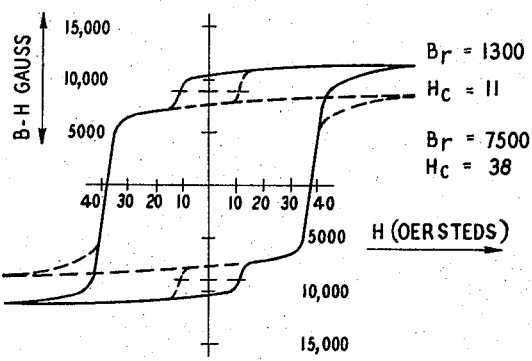
FIG. 4 is a similar plot on the same coordinates for a different composition processed so as to yield the composite loop configuration of this invention.
Figure 5:
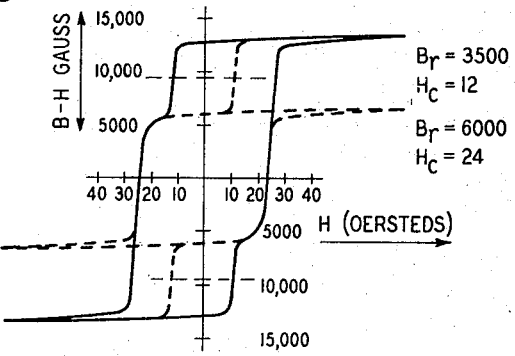
FIG. 5 is a similar plot on the same coordinates for the composition of FIG. 1, however reduced under different conditions and subsequently annealed so as to yield the composite characteristic.

The cold worked strip was heat treated for two hours at 580° C. FIG. 4 shows the hysteresis loop measured for this material. This material differed from that of Example 3 only in the vanadium content. Increasing vanadium resulted in a large increase in the coercivity of the major loop. From FIG. 4 it is seen that the major loop characteristics are: $H_c$ equals 38 oersteds, $B_R$ equals 7500 gauss, and for the minor loop, $H_c$ equals 11 oersteds and $B_R$ equals 1300 gauss.

EXAMPLE 5

The composition and the processing of Example 1 were repeated, however continuing the thickness reduction by cold working to 0.6 mil or to a thickness reduction of 99.4 percent. After a two-hour anneal at 580° C. in a protective atmosphere, the strip exhibited the hysteresis loop shown in FIG. 5. The material differs from that of Example 2 only in the increased cold working. Comparison of FIG. 5 with FIG. 3 indicates that the work had the effect of decreasing the residual induction for the major loop and increasing the residual induction for the minor loop. The major and minor loop characteristics are: $H_c$ equals 24 oersteds, $B_R$ equals 6000 gauss; and $H_c$ equals 12 oersteds, $B_R$ equals 3500 gauss, respectively.

Examples 6 through 8 are illustrative of experiments directed toward the production of wire and ribbon configurations. For expediency, these three examples all utilize the alloy composition of Example 4 and differ one from the other only in the processing conditions, that is, in the type of cold reduction utilized. The entire described system has been exhaustively studied, and it has been found that composite loop characteristics are dependent only on the compositional range specified, followed by 90 percent cold reduction and annealing, as also described. The loop characteristics are found to be independent of the type of cold reduction utilized, so it is concluded that flat rolling, roll flattening, round and flat drawing, swaging, hammering, etc. may be utilized with equal facility, leaving the operator free to choose the cold reduction mechanism in accordance with the desired configuration.

EXAMPLE 6

A melt was prepared of the following materials:

Cobalt _____ 1612 grams, or 80.6 weight percent.
Iron _____ 230 grams, or 11.5 weight percent.
Vanadium _____ 150 grams, or 7.5 weight percent.
Manganese _____ 8 grams, or 0.4 weight percent.

The materials were reacted at a temperature of approximately 1550° C. The melt was held at temperature for about two minutes to ensure thorough mixing and solution of the ingredients and was then poured into a mold and solidified to make an ingot about three-quarters inch in diameter and eight inches in length. The ingot was heated to a temperature of 1200° C. and hot rolled to a rod 180 mils in diameter. Attainment of this diameter required about ten steps, with reheating between steps as required. The resulting rod was examined and surface defects were removed by machining. It was then dead annealed at 950° C. for one hour in a protective atmosphere of hydrogen. The rod was then round drawn to a final wire of two-mil diameter. Intermediate anneals were required at about one-eighth inch and one-sixteenth inch. Cold reduction from one-sixteenth inch diameter to two-mil diameter represents a reduction in excess of 90 percent as defined.

In the cold drawn state the wire had a hysteresis loop of the form of that shown in FIG. 1. The residual induction was 14,000 gauss for a coercive force of ten oersteds. The drawn wire was then annealed at 625° C. for two hours. The resulting hysteresis loop had the composite characteristics of that shown in FIG. 2. The residual inductions and coercive forces for the major and minor loops were 9000 gauss, 1500 gauss, and 37 oersteds, 14 oersteds, respectively.

EXAMPLE 7

The composition of Example 6 was processed to five-mil diameter while otherwise following the processing scheduling outlined in that example. Attainment of this final dimension represents a cold reduction in excess of 90 percent. The round wire was then flattened to ribbon by drawing through diamond dies. The final configuration, having dimensions one-half by six-mil, had a residual induction of 6500 gauss and a coercive force of nine oersteds. The hysteresis loop so defined was of the general form shown in FIG. 1.

After annealing for a period of two hours at a temperature of about 600° C., the composite characteristics of FIG. 2 resulted. The residual inductions were 6000 gauss, 2400 gauss, and the coercive forces were 43 oersteds, 14 oersteds for the major and minor loops, respectively.

EXAMPLE 8

The processing and composition of Example 6 were repeated, and the final two-mil round wire was roll flattened by one pass through a rolling mill. The dimensions of the final ribbon were ½ by six-mil. In the hard state, before annealing, the hysteresis loop, again showing the general form of that of FIG. 1, showed a residual induction of 12,500 gauss and a coercive force of 14 oersteds.

The cold-worked ribbon was then annealed for a period of two hours at 600° C., again resulting in the composite loop characteristics of FIG. 2. The residual inductions were 8500 gauss, 1800 gauss, and the coercive forces were 37 oersteds, 17 oersteds for the major and minor loops, respectively.

Examples 1 through 5 were deliberately chosen to represent similar processing conditions and to represent only one or a small number of variables from example to example. With this in mind, the configuration from example to example prior to final cold working was of the same dimensions and was dead annealed so as to relieve the strain introduced during prior processing. This data is to be considered as exemplary only and in no way to limit this disclosure which has been generally described as requiring only a cold working so as to result in a thickness reduction of at least 90 percent, followed by a partial anneal as set forth.

Figure 6:
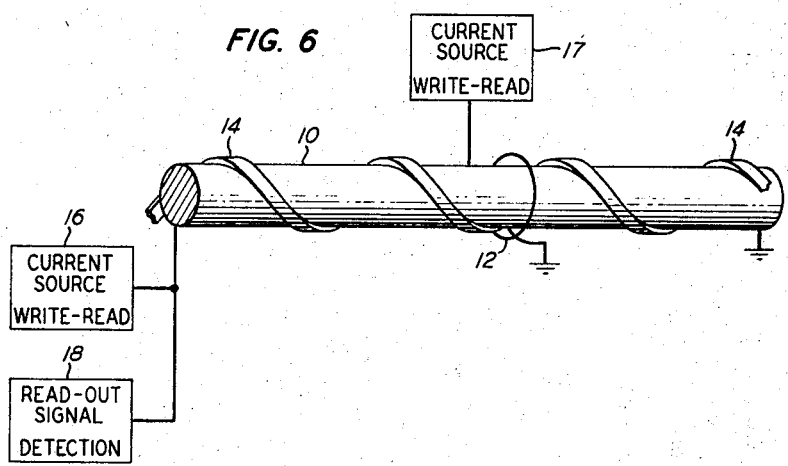
FIG. 6 is a view of a magnetic memory device utilizing an element constructed of a material of this invention.

The device of FIG. 6 is a memory element known as the twistor. This device, which depends upon the direction of remanent magnetization of a length of magnetic tape (a memory bit) for information, is fully described in U.S. Patent 3,083,353, issued Mar. 26, 1963 to A. H. Bobeck. This device includes a metallic conductor 10, about which there is disposed a helical winding 14 of a tape configuration of a composition herein. The possible directions of the flux in the winding 14 are in either helical direction. One end of the conductor 10 is connected to a current source 16, and the other end is connected to ground. A series of external insulated windings represented by 12, one end of each of which is connected to ground, the other end being connected to a current source 17, are inductively coupled to the conductor 10. Initially, all the bits, that is sections, of winding 14 corresponding with windings 12, are magnetized in a given direction representing, for example, a binary zero.

To switch any given bit, it is necessary to generate a current sufficient to produce a magnetomotive force, H, equal to the coercivity $H_c$ of the major loop of the appropriate material in order to produce an opposite flux direction. When a current pulse producing a magnetomotive force of a magnitude of $H/2$ is applied from the source 16 simultaneously with a current pulse again producing a magnetomotive force of the magnitude $H/2$ from a given source 17, the total magnetomotive force is sufficient to switch the flux state of the associated length of winding 14, so producing a binary 1. In accordance with the principles of coincident current memory elements generally, either of the current pulses applied from the sources 16 and 18 alone is insufficient to accomplish the magnetic switching.

Information stored in the winding 14 now represents a permanent memory which will be destroyed only upon passage of currents of the magnitude indicated to produce a magnetomotive force of the opposite direction and of the same magnitude. Information stored in the winding 14 may be read out nondestructively by reversing the polarity of the currents applied from the sources 16 and 17 while reducing their magnitude, so that they coincidently produce a magnetomotive force sufficient to overcome the coercivity of the minor loop but insufficient to overcome the coercivity of the major loop. For example, utilizing the material of Example 4, permanent store is achieved by utilizing half currents such as to coincidentally produce a field of 42 oersteds, while reading is accomplished with half currents together producing a field of only 10 oersteds. The simultaneous half currents of reduced magnitude applied from sources 16 and 17 cause switching in the direction of magnetization in the helical winding if an information bit has been previously stored in the manner described above. No switching occurs for any bit magnetized in the zero direction. At the termination of the read pulse, the remanent field of the harder material represented by the major loop overcomes the coercivity of the minor loop and returns it to its saturation magnetization. When the magnetic state of the minor loop material of winding 14 is switched during the read function, a change of potential results. This change may be detected by suitable detection means 18, as an output pulse superimposed on the switching current pulse.

The device of FIG. 6 is the full equivalent of the piggyback device of U.S. Patent 3,067,408 in representing an electrically alterable permanent magnetic memory and may utilize a circuitry suitable for this purpose.

Figure 7:
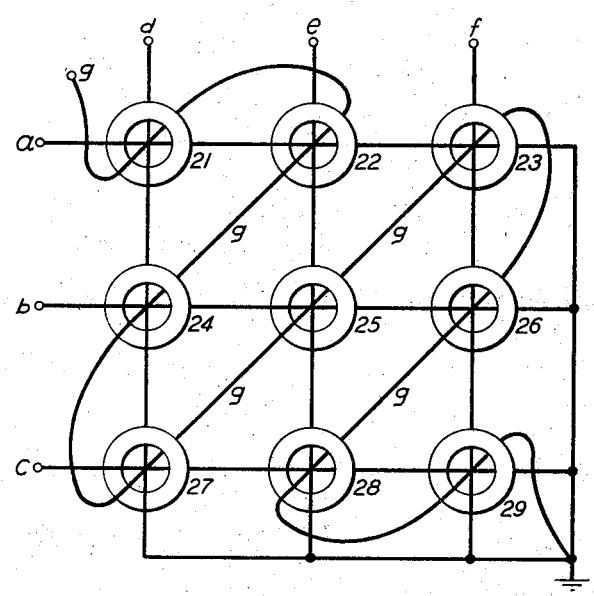
FIG. 7 is a schematic representation of a memory array utilizing elements again constructed of a material herein.

FIG. 7 depicts a bit-organized memory array disclosed and claimed in U.S. Patent 2,825,891, and a more complete description of the operation of this device as a temporary memory array may be found there. Again, utilization of a material herein in cores 1 through 9 permits use of the array as an electrically alterable memory by the simple expedient of using two levels of half currents, the larger of which are coincidentally of such magnitude as to switch the major loop and the lesser of which, while inadequate for this purpose, are sufficient to switch the minor loop. In such a device, cores 1 through 9 are connected through input windings $a$ through $f$, and an output winding $g$, each connected to energizing means, not shown, which windings are single conductors. Each of the cores 1 through 9 is initially in a magnetically remanent condition, with the direction of polarization signifying "0." The writing of a "1," characterized by a remanent condition with an opposite polarization in a given core, is effected by supplying to each conductor associated with said core a current pulse having a value sufficient to produce a flux equal to or slightly more than one-half that required to saturate the major loop of the core. In the core 8, for example, a "1" is written by supplying a pulse of such magnitude through each of the conductors $e$ through $c$, the cores 2, 5, 7, and 9 then being energized only by half currents. This pulse, produced in these four cores, is therefore insufficient to effect a change in direction of polarization. The reading-out is effected similarly as described, again using coincident half currents, however of reduced magnitudes as indicated and of negative direction. This has the effect of switching the minor loop material of core 9, during the course of which a current pulse is induced in readout winding $g$. Removal of the readout pulse permits return to the saturation condition indicated on the minor loop by reason of the remanent magnetization represented by the major loop.

FIG. 8 depicts a word-organized memory array known as the "waffle iron." This array is constructed of a high magnetic permeability base plate 11, being formed in such fashion as to include protruding posts 12 resembling those of a waffle iron in outward appearance, with a closely fitting overlay sheet of magnetic material 18 of a composite loop composition in accordance with this invention positioned across the top of posts 12. The magnetic sheet 18 is advantageously clamped tightly against posts 12 in order to minimize total reluctance of magnetic paths which include both the posts 12 and sheet 18. This clamping is here achieved by means of a metallic pressure plate 19 above the sheet 18 and clamping screws 20 between plate 19 and end portions of the base plate 11. Two electrical conductive paths, any one of windings $13_1$ through $13_5$, together with any one of $15_1$ through $15_3$, each connected to energizing means, not shown, are associated with each of posts 12. Writing is accomplished in coincident fashion, supplying half currents in the manner described so as to overcome the coercivity of the major loop to a selected pair of such windings. Reading is accomplished by application of a subsequent interrogating signal, again only of such value as to switch the minor loop material, to a word conductor $13_1$ through $13_5$, so inducing an output signal in the particular conductor $15_5$ through $15_3$, the polarity of which is indicative of the stored binary value. A complete description of the operation of such device is set forth in the reference noted above.

The device of FIG. 9 is a memory array utilizing twistor memories such as that of FIG. 6 here included to illustrate the operation of an internally biased core switch constructed of a material herein. The array is composed of twistor elements 40 and return paths 41. The particular array shown is word organized, with access to the required number of bits being obtained by use of associated core switch 42. Interrogation is accomplished when half currents passing through windings 43 and 44, 45 or 46 produce a change in magnetization of the appropriate core 42. For this configuration, flux reversal in core 42 produces an induced current in corresponding winding 47 which, in turn, produces a field of sufficient magnitude to result in the desired change in magnetization in the bits represented by the encompassing portions of twistor 40. Access drive currents are of such magnitude as to produce a field sufficient only to overcome the coercivity of the minor loop of the material of which the core is constructed. Upon removal of the access drive currents, or one of them, the remanent magnetization of the major loop, in being sufficient to overcome the coercivity of the minor loop, switches it back to its initial position, so that it is again in condition for interrogation.

The invention has necessarily been described in terms of a limited number of exemplary embodiments. While these are considered adequate to illustrate the advantageous use of any of the materials herein in an electrically alterable permanent memory device such as a switch or memory element, they are not to be construed as limiting. Generally, the materials of this invention are suitable in the fabrication of any device in which the remanent magnetization of the hypothetical material represented by the resolved major loop of the composite hysteresis loop is sufficient to overcome the coercivity of the resolved minor loop. The invention is to be so construed.

What is claimed is:

1. Device comprising a ferromagnetic body comprising an alloy consisting essentially of 78 to 95 weight percent cobalt, 4.5 to 11 weight percent vanadium, remainder iron, produced by cold work so as to produce a thickness reduction of at least 90 percent based on the ratio:

$$\frac{t_1 - t_2}{t_1}$$

where $t_1$ and $t_2$ are a dimension of the body subject to reduction in the working operation, before and after working, respectively, followed by heat treatment at a temperature of from 150° C. to 800° C., said body exhibiting a composite hysteresis loop composed of components of a major and a minor loop, the said body having associated therewith at least one electrical current path so situated that passage of current through the said path results in a magnetic field within at least a portion of the said body and means for magnetically switching said minor loop independently of said major loop.

2. Device of claim 1 in which the said electrical current path consists of at least one turn of conductive wire about the said body.

3. Device in accordance with claim 1 in which the said body is torroidal in configuration, and in which the said current path is established by a wire threaded through the said body.

4. Device of claim 3 in which there are two independent wires threaded through the said body.

5. Device of claim 3, together with means for supplying two different current levels through the said at least one current path, one such level being sufficient to switch the direction of magnetization of the entire material of the said body, and the second level being sufficient to switch only the minor hysteresis loop of the said body.

6. Device comprising a body of material defining at least one magnetically remanent flux path, the said body comprising an alloy consisting essentially of 78 to 95 weight percent cobalt, 4.5 to 11 weight percent vanadium, remainder iron, produced by cold working to result in a thickness reduction of at least 90 percent as determined from the fraction:

$$\frac{t_1 - t_2}{t_1}$$

in which $t_1$ and $t_2$ are a dimension of the body subject to reduction by working, before and after working, respectively, followed by partially annealing at a temperature in the range of from 150° C. to 800° C. for a period of at least ½ minute, said body exhibiting a composite hysteresis loop composed of components of a major and a minor loop, said body having associated therewith at least two electrical paths and means for magnetically switching said minor loop independently of said major loop.

7. Device of claim 6 in which the said body constitutes a helical winding about a metallic member, the said member representing one of the said current paths.

References Cited

UNITED STATES PATENTS

| | | | |
|---|---|---|---|
| 1,715,543 | 6/1929 | Elmen | 75—170 |
| 1,739,752 | 12/1929 | Elmen | 148—121 XR |
| 1,862,559 | 6/1932 | White | 148—121 XR |
| 1,927,940 | 9/1933 | Koster | 148—31.57 XR |
| 2,519,277 | 8/1950 | Nesbitt et al. | 148—31.57 XR |
| 2,709,248 | 5/1955 | Rosenberg | 340—174 |
| 2,736,880 | 5/1956 | Forrester. | |
| 2,825,891 | 3/1958 | Duinker. | |
| 2,912,677 | 11/1959 | Ashenhurst et al. | |
| 2,963,591 | 12/1960 | Crowley et al. | |
| 3,065,118 | 11/1962 | Wawrousek | 148—31.55 |
| 3,067,408 | 12/1962 | Barrett. | |
| 3,083,353 | 3/1963 | Bobeck. | |
| 3,086,280 | 4/1963 | Gibbs et al. | 148—121 XR |
| 3,189,493 | 6/1965 | Chen | 148—120 |
| 3,348,983 | 10/1967 | Odani et al. | 148—121 XR |
| 3,355,724 | 11/1967 | Brownell et al. | 340—174 |

OTHER REFERENCES

Ferromagnetism by R. M. Bozorth, 1951, pp. 638, 639.

HYLAND BIZOT, *Primary Examiner.*

PAUL WEINSTEIN, *Assistant Examiner.*

U.S. Cl. X.R.

75—170; 148—31.55, 31.57, 100, 120, 121